(12) United States Patent
Michiels

(10) Patent No.: US 7,404,989 B2
(45) Date of Patent: Jul. 29, 2008

(54) COMPOSITE ARTICLE AND ITS MANUFACTURE

(75) Inventor: Dany Felix Maria Michiels, Haaltert (BE)

(73) Assignee: Milliken & Company, Spartanburg, SC (US)

( * ) Notice: Subject to any disclaimer, the term of this patent is extended or adjusted under 35 U.S.C. 154(b) by 371 days.

(21) Appl. No.: 10/815,343

(22) Filed: Apr. 1, 2004

(65) Prior Publication Data

US 2005/0129919 A1 Jun. 16, 2005

(30) Foreign Application Priority Data

Dec. 13, 2003 (GB) ................... 0328948.5

(51) Int. Cl.
*H05H 3/02* (2006.01)
*B05D 1/18* (2006.01)
*B32B 25/02* (2006.01)

(52) U.S. Cl. .................. 427/538; 427/413; 152/565; 156/181; 442/104; 428/378

(58) Field of Classification Search ............. 442/157, 442/168; 428/169, 173
See application file for complete search history.

(56) References Cited

U.S. PATENT DOCUMENTS

| 5,139,873 | A | * | 8/1992 | Rebouillat | ............ | 428/375 |
| 5,411,638 | A | * | 5/1995 | Bernard et al. | ............ | 204/165 |
| 5,705,445 | A | * | 1/1998 | Chikaraishi et al. | ......... | 442/104 |
| 6,046,262 | A | | 4/2000 | Li et al. | ............ | 542/261 |
| 6,096,156 | A | * | 8/2000 | Morin et al. | ............ | 156/272.6 |
| 6,265,333 | B1 | * | 7/2001 | Dzenis et al. | ............ | 442/346 |
| 6,333,281 | B1 | | 12/2001 | Li et al. | ............ | 442/157 |
| 6,346,563 | B1 | | 2/2002 | Li et al. | ............ | 524/261 |
| 6,444,322 | B1 | | 9/2002 | Li et al. | ............ | 428/447 |
| 6,497,954 | B1 | * | 12/2002 | Morin et al. | ............ | 428/375 |
| 6,602,379 | B2 | | 8/2003 | Li et al. | ............ | 156/335 |
| 6,686,301 | B2 | * | 2/2004 | Li et al. | ............ | 442/157 |

FOREIGN PATENT DOCUMENTS

| EP | 0 045 217 A | 2/1982 |
| EP | 0 051 363 A | 5/1982 |
| GB | 2 030 582 A | 4/1980 |
| GB | 2 030 999 A | 4/1980 |
| JP | 04-457821 | 2/1992 |
| WO | WO 03/066943 | 8/2003 |

OTHER PUBLICATIONS

Albrecht et al., Nonwoven Fabrics, (2003), p. 324, ☐☐http://books.google.com/books?id=w3c9DpqdziQC&pg=PA324&lpg=PA324&dq=weft+insertion+warp+knit&source=web &ots=r4cQHlxrgG &sig=MycRJ9OMIOA97bd2u2CAq-GYeYI☐☐Downloaded from the internet Nov. 15, 2007.☐☐.*

* cited by examiner

*Primary Examiner*—Milton I. Cano
*Assistant Examiner*—Brett A Crouse
(74) *Attorney, Agent, or Firm*—Cheryl J. Brickey

(57) ABSTRACT

A composite article is provided which comprises a silicone rubber matrix reinforced with a polyaramid textile. The polyaramid textile is bonded to the silicone rubber by a bonding composition that comprises at least an acryloxy organosilane. The article is manufactured by dipping polyaramid textile into an organosilane dip that comprises an acyrloxy organosilane. The so-dipped polyaramid textile is then bonded to silicone rubber.

7 Claims, 1 Drawing Sheet

COMPOSITE ARTICLE AND ITS MANUFACTURE

TECHNICAL FIELD

This invention relates to a composite article comprising a silicone rubber matrix reinforced with polyaramid textile that is bonded to the silicone rubber matrix. The invention also relates to a method to manufacture the article and in particular to a method to obtain a strong bond between the polyaramid textile and the silicone rubber.

BACKGROUND TO THE INVENTION

WO 03/066943 describes the production of a coated polyaramid and the use of this coated polyaramid to produce a reinforced article. A range of matrix materials is given; silicones are among the listed materials. Yarns of poly-p-phenylene terephathalamide (p aramid) are first coated with a curable epoxy compound before application of a second coat of resorcinol-formaldehyde-latex (RFL) and then bonding the double coated polyaramid to a rubber or a rubber like material. The epoxy compound preferably comprises di and/or triglycidyl ether of glycerol or the polyglycidyl ether of polyglycerol. It is stated that the advantage of the invention is that the epoxy pre-coated polyaramid has a good RFL pickup. The use of such a bonding system for silicone rubber has been found to be unsatisfactory due to the unsuitability of RFL as a bonding agent for silicone rubbers. It is desirable to develop a suitable bonding system for silicone rubber because for many high temperature applications, such as turbo hoses for cars, other rubber types are less suitable. Furthermore many reinforcement cords are also unsuited for such high temperature yet low modulus applications. It is therefore an objective to make a strong bond between polyaramid and silicone rubber.

JP4057821 describes a polysulphide modified epoxy resin prepreg composition for polyaramid fibre. The use of this coated polyaramid as a reinforcement for silicone rubber is not disclosed.

JP9124801 describes the coating of polyaramid with polyamide resin in order to improve its bonding to a matrix of epoxy resin.

Organosilanes are well known as bonding agents. Trialkoxyorganosilanes have been used to enhance adhesion of organic polymers to inorganic substrates such as glass and metals. Trialkoxyorganosilanes are hypothesized to promote adhesion though a combination of a coupling mechanism and the formation of interpenetrating networks via hydrolysis of the alkoxy groups to form silanols which then condense to form silsesquioxane networks. Trimethoxysilanes are the preferred trialkoxyorganosilanes for this purpose.

3-methacryloxypropyl-trimethoxysilane is offered by many silane coupling agent manufacturers as suitable for coupling organic materials, such as butyl, polyester, polyether, polyolefin and inorganic materials, such as glass fiber. In U.S. Pat. No. 6,046,262 there is described a dip system comprising a mixture of an aminosilane with another organosilane. In comparative example 5 a 100% polyester fabric sample was dipped into an aqueous dispersion of the organosilane methacryloxypropyltrimethoxysilane and dried. The fabric was then impregnated with resorcinol formaldehyde vinylpyridine latex (RFL) and bonded to SBR. The bond peel strength was shown to be inferior to a sample coated using a dip comprising methacryloxypropyltrimethoxysilane and an aminosilane.

In U.S. Pat. No. 6,096,156 low-pressure plasma treatment of polyaramids to improve their bonding to coatings and rubber is described. A polyaramid cord (Twaron®) is subjected to low pressure plasma treatment including a first plasma stage in which the cord is cleaned by exposure to a plasma containing $O_2$ and $CF_4$ and a second plasma stage in which the cord is plasma coated by exposure to a plasma containing a vinyl compound; such as: acrylic acid, ethylene, butadiene, vinyl pyridine. After this plasma treatment the cord may optionally be further activated by coating with an epoxy compound before it is coated with the usual RFL and bonded to rubber. No mention is made of silicone rubber. It is suggested that the plasma treated polyaramid may have a coating of polysiloxane tackifier applied before bonding it to rubber. This tackifier would be applied over the RFL.

Dow Corning Q-1-6106 adhesion promoter is described in the Material safety data sheet from Dow as being 10 to 30% glycidoxypropyl trimethoxysilane. Dow's product information sheet for Q-1-6106 states that this adhesion promoter will "provide coupling of most reinforcing agents such as glass or Kevlar® to most polar organic polymers and engineering plastics". Rubbers are not listed among these.

BRIEF DESCRIPTION OF DRAWINGS

The invention will now be further described with reference to the following non-limiting examples and with reference to the figures of which

DETAILED DESCRIPTION

Figure 1:
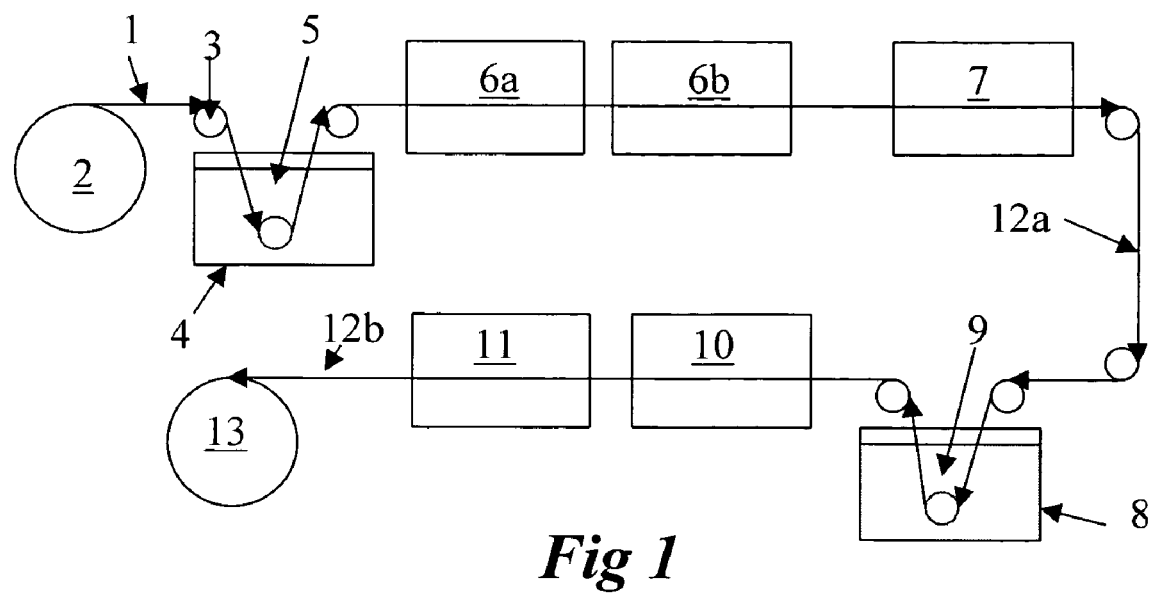
FIG. 1 is a schematic representation of a polyaramid cord treatment process.

According to the present invention there is provided a composite article comprising a polysiloxane or silicone rubber matrix reinforced with polyaramid textile characterized in that the polyaramid textile is bonded to the silicone rubber by means of a bonding composition comprising an acryloxy organosilane of formula (I):

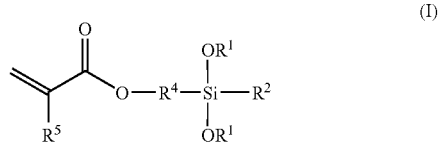

(I)

In formula (I) $R^1$ is a moiety selected from methyl, ethyl, combinations thereof and methoxyethyl, $R^2$ is a moiety selected from methoxy, ethoxy, methyl, ethyl, and methoxyethoxy.

$R^4$ is selected from $C_2$-$C_8$ alkylene, branched or unbranched.

$R^5$ is a moiety selected from hydrogen and methyl and is preferably methyl.

Preferred acryloxy organosilanes have formula (II)

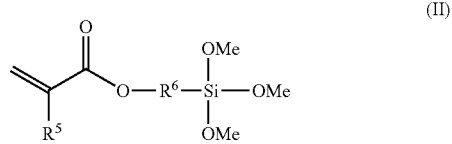

(II)

Where $R^6$ is $C_2$-$C_4$ alkylene and $R^5$ is as defined in formula (I).

The most preferred acryloxy organosilane is 3-methacryloxypropyl trimethoxysilane, which has the formula (III):

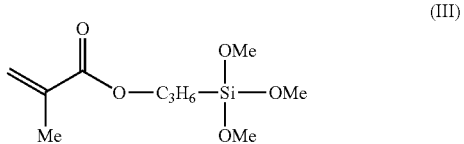

(III)

Preferably to obtain the best adhesion the polyaramid is precoated or activated with an epoxy compound. The preferred epoxy compounds are selected from the group comprising di and/or tri glycidyl ethers of glycerol; a suitable diglycidyl ether is GE100 glycidyl ether 100 from Raschig Chemicals. An alternative epoxy compound that may be used is a polyglycidyl ether of polyglycerol; a suitable polyglycerol glycidyl ether is GE500 from Raschig Chemicals.

Any of the well known polyaramids may be utilized in the present invention, a p-phenylene polyaramid such as that known under the trade name Twaron® or Kevlar® or a m-phenylene polyaramid such as that known under the trade name Nomex®, or even a mixed meta and para polyaramid or copolymers which comprise also naphthalinic units and are known under the trade name Technora®. Generally the more one moves away from the relatively inextensible purely p-phenylene forms the more suited the yarns produced therefrom are to the reinforcement of rubber. Extensibility is good for the bonding of the polyaramid to the rubber as the closer matching of modulus gives less stress on the bond when the composite is compressed or stretched.

Throughout this patent specification the expression polyaramid textile includes all ways to use polyaramid yarn, for example the polyaramid yarn may be in the form of a cord made from twisted together yarns, or it may be in the form of a fabric, which can be processed as a web. A preferred fabric construction has the polyaramid cord knitted as a warp yarn and/or as a weft yarn in a weft insertion warp knit process. The polyaramid may be provided as an inlay warp yarn or as a weft inserted yarn or both. Other textile constructions are also possible.

Advantageously the organosilane bonding composition further comprises an epoxy organosilane. The combination of different organosilanes in this way allows one of the silanes to be optimized for adhesion to the silicone and the other to be optimized for adhesion to the polyaramid or epoxy coated polyaramid. A preferred epoxy silane is shown in formula (IV):

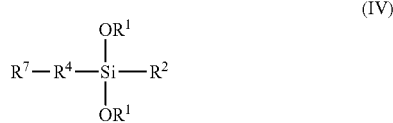

(IV)

Wherein $R^1$, $R^2$ and $R^4$ have the same meanings as defined for formula (I) and $R^7$ is selected from the group comprising gamma glycidoxy and 2(3,4 epoxycyclohexyl). Preferably $R^2$ is $OR^1$ and most preferably $R^1$ is methyl. Preferably $R^4$ is propyl and most preferably the epoxy organosilane is gamma-glycidoxypropyl trimethoxysilane.

The composition may also include a vinyl organosilane of formula (V).

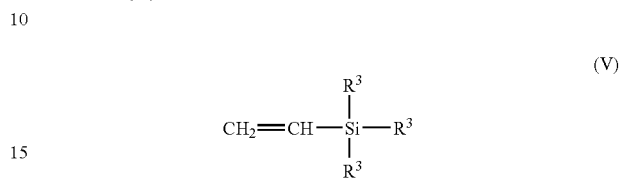

(V)

Wherein $R^3$ is selected from the group comprising methoxy, ethoxy and chlorine moieties. Preferably the vinyl organosilane is vinyl trimethoxysilane.

In the case that the process used to coat the polyaramid includes plasma activation of the cord the organosilane composition may further comprise an amino organosilane. The amino organosilane may have the formula (VI):

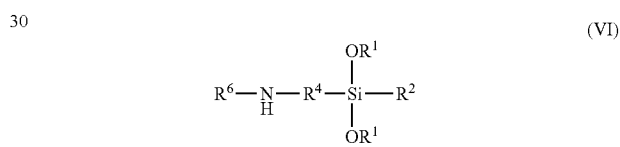

(VI)

Wherein $R^1$, $R^2$ and $R^4$ have the same meanings as defined for formula (I) and $R^6$ is selected from the group comprising hydrogen, phenyl and ethylamino. Preferably the amino organosilane is N-phenyl gamma aminopropyl trimethoxysilane.

Also according to the invention there is a process for manufacturing an polyaramid reinforced silicone rubber article comprising the steps of:

a) Selecting a polyaramid textile, b) Optionally activating the polyaramid textile with an epoxy compound, and/or optionally activating the polyaramid textile with plasma, c) Dipping the polyaramid textile into an organosilane dip comprising acryloxy organosilane, d) Bonding the dipped polyaramid textile to silicone rubber.

Preferably the organosilane dip further comprises an epoxy organosilane. For environmental and health reasons it is preferred that the organosilane dip is an aqueous dip. By aqueous we mean a solution or dispersion of organosilane, which comprises a major part of water. As a co-solvent there may also be a minor part of an organic solvent, such as methanol or IPA, or other alcohols.

It is advantageous if the epoxy activation and the organosilane dipping steps are carried out separately and with drying after each step. The drying is preferably done at elevated temperature in an oven.

To further improve the cover and/or the bond strength of the organosilane or other coating material applied from the dips it is advantageous to activate the polyaramid with plasma before dipping. Preferably the plasma treatment is applied to a dry polyaramid and most preferably it is applied to a polyaramid that has already been activated with epoxy compound. It is most advantageous if the plasma treatment is done by means of use of air plasma. In the case where the epoxy compound has been dried before a dip containing a mixture of acryloxy organosilane and amino functional organosilane as described, for example, in U.S. Pat. No. 6,046,262, an air plasma comprising an aerosol of glycerol in a nitrogen carrier, perhaps also with an alcohol diluent such as IPA is preferred. An atmospheric air plasma treatment is preferred for use before organosilane dips that do not contain an amino functional organosilane. Preferred epoxy compounds are as described above, the epoxy compound needs to be dispersed in a suitable medium for dipping as described in WO 03/066943.

The epoxy functional organosilane may be used in combination with a vinyl organosilane.

It is preferred that the polyaramid textile is in the form of a cord or a fabric including such a cord.

FIG. 1 shows a polyaramid yarn or cord 1 being drawn from a feed roll 2. In this example the yarn is a 1680 decitex p-phenylene polyaramid yarn. The yarn is optionally activated before it is coated with acryloxy organosilane. Activation can be by means of epoxy and/or plasma. In the case where epoxy activation is used one means to achieve that activation is to pass the yarn over tensioning and feed roller 3 and into a dip bath 4. When this optional dip bath 4 is used it contains an epoxy dip 5, which has been prepared as described in example 1 of WO 03/066943. If the yarn or cord is dipped into the epoxy compound dip 5 it is then dried in a pair of air ovens 6a, 6b at a temperature of about 150° C. to activate the polyaramid. The tension of the yarn 1 through the epoxy compound dip 5 and the oven 6 is about 25 mN/tex.

Alternative methods to activate the yarn or cord with the epoxy compound may be used. For example it can be applied during the spin finishing or drawing of the yarn, it may even be applied during an aerosol plasma treatment. It is preferred to twist the yarn before it enters dip 5. After coating with epoxy and drying, the yarn is preferably twisted to form a cord if the yarn 1 is not already a cord. For our examples we used a 2 ply cord of 3360 decitex. Samples of dried polyaramid cord with or without epoxy activation were optionally subjected to a plasma activation treatment. In a first optional plasma activation treatment, the cord or yarn was exposed to air plasma in plasma apparatus 7. In an alternative optional plasma activation treatment the cord was activated by exposure in plasma apparatus 7 to an air plasma that contained an aerosol of glycol or glycerol in a nitrogen carrier, this latter option being intended to promote maximum activation of the surface of the cord in the case where an amino functional organosilane is used in admixture with the acryloxyorganosilane in the subsequent silane dip. The plasma treatment 7 is shown as being after the epoxy activation but it could alternatively or additionally be carried out before the epoxy activation or in place of the epoxy activation.

The cord 12a is passed to a dip bath 8 to be coated using an aqueous organosilane dip 9 having one of the compositions A, B C or D as detailed in table 1. Table 2 indicates which cords were subjected to plasma activation before being passed into organosilane dip 9. The dip-coated cord 12b was removed from dip bath 8 and then air-dried in air ovens 10 and 11 before the coated cord 12b was wound onto storage roll 13. The dip coating conditions in all cases were to pull the cord through the dip 9 and the air-drying ovens 10 and 11 under a tenacity of about 25 mN per tex. The temperature of the ovens 10 and 11 was maintained in the range 170 to 260° C.

Figure 2:
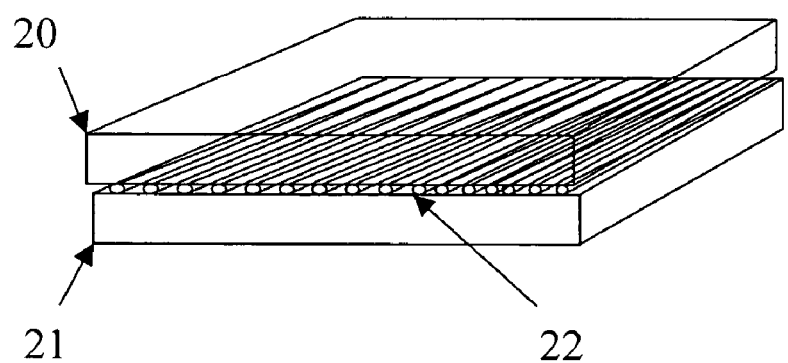
FIG. 2 is a cord reinforced rubber article before pressing and vulcanization.

The coated cord 12b was subsequently bonded to a peroxide cured silicone rubber obtained from Wacker under the name Elastosil R760/70-MH-C1H3 and vulcanized, as will be described in further detail with reference to FIG. 2.

TABLE 1

| | Organosilane Dip | | | |
|---|---|---|---|---|
| | Acryloxy silane | Epoxy silane | Vinyl silane | Amino silane |
| Dip A | gamma-methacryloxypropyl trimethoxysilane | — | — | — |
| Dip B | gamma-methacryloxypropyl trimethoxysilane | gamma-glycidoxypropyl trimethoxysilane | — | — |
| Dip C | gamma-methacryloxypropyl trimethoxysilane | gamma-glycidoxypropyl trimethoxysilane | vinyl trimethoxysilane | — |
| Dip D | gamma-methacryloxypropyl trimethoxysilane | — | — | N-phenyl gamma aminopropyl trimethoxysilane |

The total weight percentage of organosilane in the dip is not critical. However, we found that generally the amount of the organosilanes used should be approximately equal and total to a weigh percentage in the range 1-5%. The exception to this is the amino organosilane which should only be used at a comparatively low level of below 0.5%. The organosilanes used were as follows:

The gamma-methacryloxypropyl trimethoxysilane used was Silquest A174 for dip A, Silquest A174NT for dips B and D and Z6040 from Dow Corning for dip B. All Silquest silanes were obtained from GE silicones. We found no difference in performance between these different sources of acryloxy organosilane.

The epoxy silane used for Dip B was Silquest A187 and for Dip C was Q-1-6106 from Dow Corning.

The vinyl silane in Dip C was Z6300 from Dow Corning and the amino silane used for Dip D was Silquest Y-9669 from GE silicones.

SPAF (Strap Peel Adhesion Force) ASTM D 4393

The peel test is designed to measure the force required to separate two textile layers vulcanized between thick rubber layers with a thin intermediate rubber layer between these textile layers. To obtain the textile layers we used closely spaced parallel cords. FIG. 2 shows a sample of a cord reinforced rubber article prior to pressing and vulcanization. For the SPAF test the top rubber layer 20 would be a thick layer and the lower layer 21 would be the thin layer beneath the top layer of cord fabric 22. There would then be a further layer of cords and a further layer of thick rubber beneath this. These are not shown in FIG. 2 because FIG. 2 is also representative of a composite article comprising silicone rubber reinforced with polyaramid cord.

For the test samples the intermediate silicone rubber layer between the cord layers was approximately 1 mm thick. After vulcanizing at a suitable elevated temperature and pressure for up to 15 minutes the test specimens were cut into 20 mm wide strips with a length of at least 70 mm and with the cord running along the length. The peel strength of the test specimen was determined using a recording tensile tester at a speed of 100 mm/min.

The adhesion is expressed as average peeling force plus or minus the standard deviation, omitting the initial force peak and measured between 20 and 70 mm strip-length.

Rubber Coverage Test

Rubber coverage is judged by three people examining the strips after testing according to the SPAF test described above. When the cords are totally covered by the coating or the rubber it is given a coverage score of 100%. A totally uncovered cord fabric is given a score of 0% and intermediate degrees of cover are judged against standards in increments of 20%. A value of 60% is considered to be a excellent coverage for most cord textile reinforced rubber products as this indicates that the bond fails by fracture of the rubber and not by parting at the rubber and reinforcement interface. However, lower values can be useful provided the overall bond strength is nearly as high as the internal strength of the rubber.

TABLE 2

| | | Unactivated polyaramid | Epoxy activated polyaramid | Plasma activated polyaramid | Epoxy and plasma activated polyaramid |
|---|---|---|---|---|---|
| Dip A | SPAF (N/cm$^2$) | 65.6 ± 20.4 | 82.2 ± 7.8 | — | — |
| | Rubber coverage % | 15% | 60% | — | — |
| Dip B | SPAF (N/cm$^2$) | 74.5 ± 13.7 | 78.7 ± 6.6 | 86.9 ± 5.6 | 87.7 ± 4.2 |
| | Rubber coverage % | 40% | 40% | 60% | 60% |
| Dip C | SPAF (N/cm$^2$) | 54.9 ± 14.3 | 67.0 ± 5.1 | 61.5 ± 3.7 | 68.5 ± 2.7 |
| | Rubber coverage % | 15% | 20% | 15% | 20% |
| Dip D | SPAF (N/cm$^2$) | 50.2 ± 18.6 | 59.0 ± 14.9 | 39.7 ± 94[a] | 75.8 ± 13.6[a] |
| | Rubber coverage % | 2% | 5% | 2%[a] | 20%[a] |

[a]means that the plasma activation was by means of a plasma of air into which was injected an aerosol of water/glycol in a nitrogen carrier, otherwise plasma activation was by air plasma at a pressure of about 6 bar.

The invention claimed is:

1. A process for manufacturing a polyaramid reinforced silicone rubber article comprising the steps in order of:
    a) selecting a polyaramid textile, the polyaramid textile being a weft insertion warp knit fabric having polyaramid weft and/or warp yarns,
    b) activating the polyaramid textile with an epoxy compound,
    c) activating the polyaramid textile with a plasma,
    d) dipping the polyaramid textile into an organosilane dip comprising acryloxy organosilane, and
    e) bonding the dipped polyaramid textile to silicone rubber.

2. A process according to claim 1 wherein said organosilane dip further comprises an epoxy organosilane.

3. A process according to claim 1 wherein said organosilane dip is an aqueous dip.

4. A process according to claim 1 in which said plasma activation comprises an air plasma.

5. A process according to claim 4 in which said plasma activation comprises an air plasma further including water as an aerosol.

6. A process according to claim 1 in which said organosilane dip further comprises an amino functional organosilane.

7. A process according to claim 4 in which said plasma activation comprises an air plasma further including epoxy as an aerosol.

* * * * *